(12) United States Patent
Yoshioka et al.

(10) Patent No.: US 7,581,466 B2
(45) Date of Patent: Sep. 1, 2009

(54) VEHICLE STEERING APPARATUS

(75) Inventors: Kazuya Yoshioka, Osaka (JP);
Yasuyuki Yoshii, Nara (JP); Kenji Higashi, Nara (JP); Shimon Jimbo, Osaka (JP)

(73) Assignee: JTEKT Corporation, Osaka (JP)

( * ) Notice: Subject to any disclaimer, the term of this patent is extended or adjusted under 35 U.S.C. 154(b) by 189 days.

(21) Appl. No.: 11/808,506

(22) Filed: Jun. 11, 2007

(65) Prior Publication Data

US 2007/0295549 A1    Dec. 27, 2007

(30) Foreign Application Priority Data

Jun. 13, 2006  (JP) .............................. 2006-163194

(51) Int. Cl.
*B62D 1/16* (2006.01)
(52) U.S. Cl. .......................... 74/492; 280/775; 280/777
(58) Field of Classification Search .................. 74/492, 74/493, 496, 498; 280/775, 777
See application file for complete search history.

(56) References Cited

U.S. PATENT DOCUMENTS

2002/0070618 A1   6/2002   Ikeda

2006/0163862 A1 *   7/2006   Satou et al. .................. 280/777
2007/0251758 A1 *   11/2007   Segawa et al. .............. 180/444
2008/0272664 A1 *   11/2008   Flynn .................... 310/154.01

FOREIGN PATENT DOCUMENTS

| DE | 100 33 810 A1 | 1/2002 |
| EP | 1 031 491 A1 | 8/2000 |
| JP | 2006-103642 | 4/2006 |

* cited by examiner

*Primary Examiner*—David M Fenstermacher
(74) *Attorney, Agent, or Firm*—Rabin & Berdo, PC

(57) ABSTRACT

A vehicle steering apparatus includes a jacket for rotatably supporting a steering shaft, and an electric motor. The electric motor includes an annular rotor arranged coaxially with the steering shaft and rotating together with the steering shaft. The jacket includes a tubular upper jacket and a tubular lower jacket that are fitted into each other and are moved axially relative to each other in the collision of a vehicle. An annular space surrounding the steering shaft is provided radially inside the rotor. A part of the upper jacket enters the annular space in the collision of the vehicle.

9 Claims, 6 Drawing Sheets

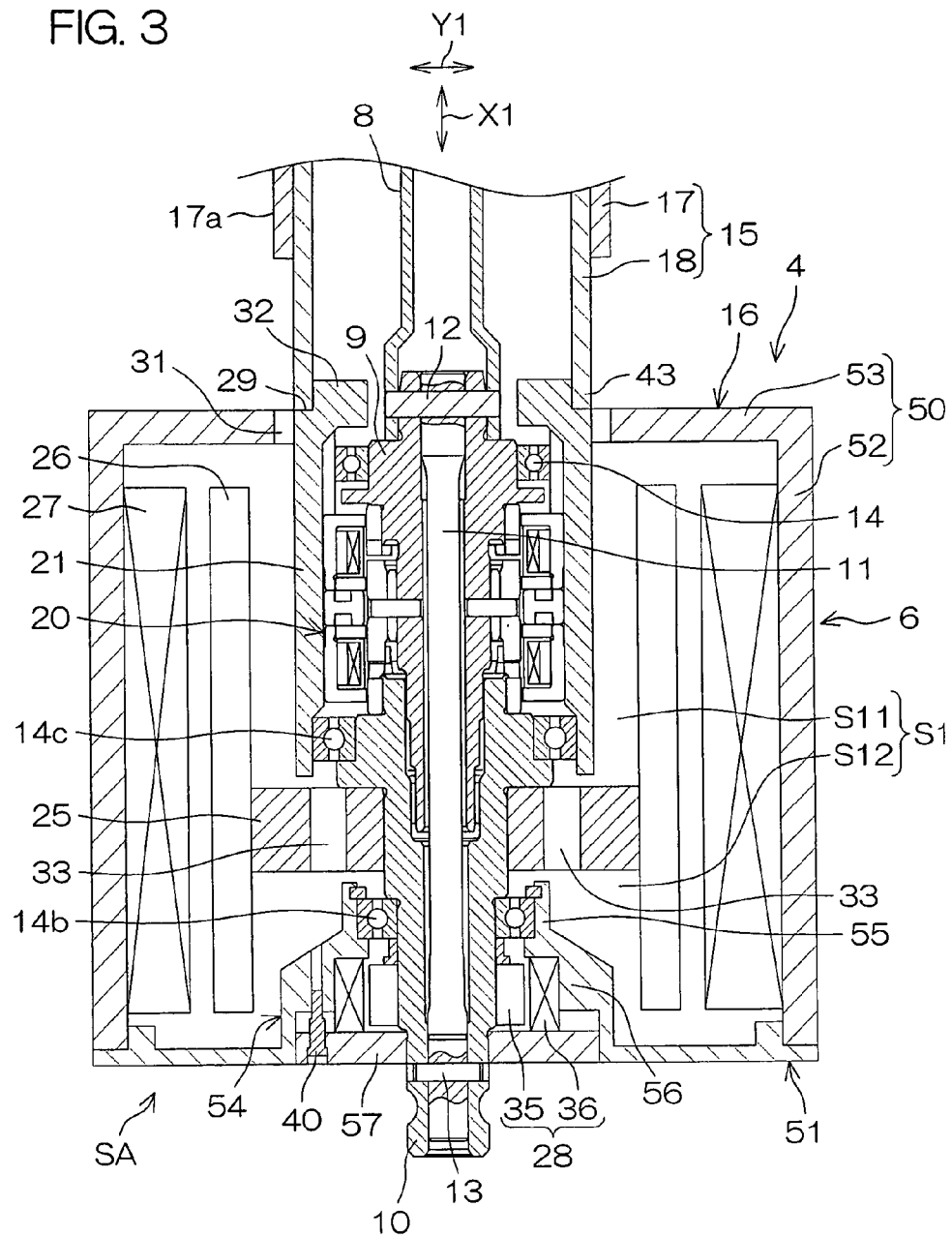

VEHICLE STEERING APPARATUS

BACKGROUND OF THE INVENTION

1. Field of the Invention

The present invention relates to a vehicle steering apparatus used for a vehicle such as an automobile.

2. Description of Related Art

Electric power steering apparatuses that assist in steering by electric motors have been known as vehicle steering apparatus.

As the electric power steering apparatuses, a coaxial motor-type electric power steering apparatus comprising an electric motor having a rotating shaft provided coaxially with a steering shaft connected to a steering member such as a steering wheel has been proposed (see Japanese Unexamined Patent Application No. 2006-103642 A, for example).

Generally, an electric power steering apparatus comprises a shock absorbing mechanism (an energy-absorbing mechanism) for absorbing shock applied to a steering member from a driver in the collision of a vehicle by contracting a steering shaft and a tubular jacket for rotatably supporting the steering shaft in the axial direction.

In a case where the coaxial motor-type electric power steering apparatus is provided with the shock absorbing mechanism, the contraction stroke of the shock absorbing mechanism (a shock absorbing stroke) may not be sufficiently ensured. The reason for this is that in the coaxial motor-type electric power steering apparatus, an electric motor occupies a part of an axial space of the steering shaft and the jacket.

An object of the present invention is to provide a vehicle steering apparatus capable of sufficiently ensuring a shock absorbing stroke.

SUMMARY OF THE INVENTION

In order to attain the above-mentioned object, in a preferred aspect of the present invention, there is provided a vehicle steering apparatus comprising a steering shaft connected to a steering member, a jacket for rotatably supporting the steering shaft, and an electric motor including an annular rotor arranged coaxially with the steering shaft. The jacket includes a tubular upper jacket and a tubular lower jacket that are fitted into each other and are moved axially relative to each other in a collision of a vehicle. The rotor is supported so as to be rotatable together with the steering shaft through a support. An annular space surrounding the steering shaft is provided radially inside the rotor. A part of the upper jacket enters the annular space in the collision of the vehicle.

According to the present embodiment, in the collision of the vehicle, the upper jacket is adapted to enter the annular space in the inside of the electric motor, so that the stroke of a steering member for absorbing shock can be sufficiently ensured and thus, the shock can be reliably absorbed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a cross-sectional view of a principal part of the electric power steering apparatus, showing an electric motor and its vicinity in enlarged fashion;

DETAILED DESCRIPTION OF THE PREFERRED EMBODIMENT

Figure 1:
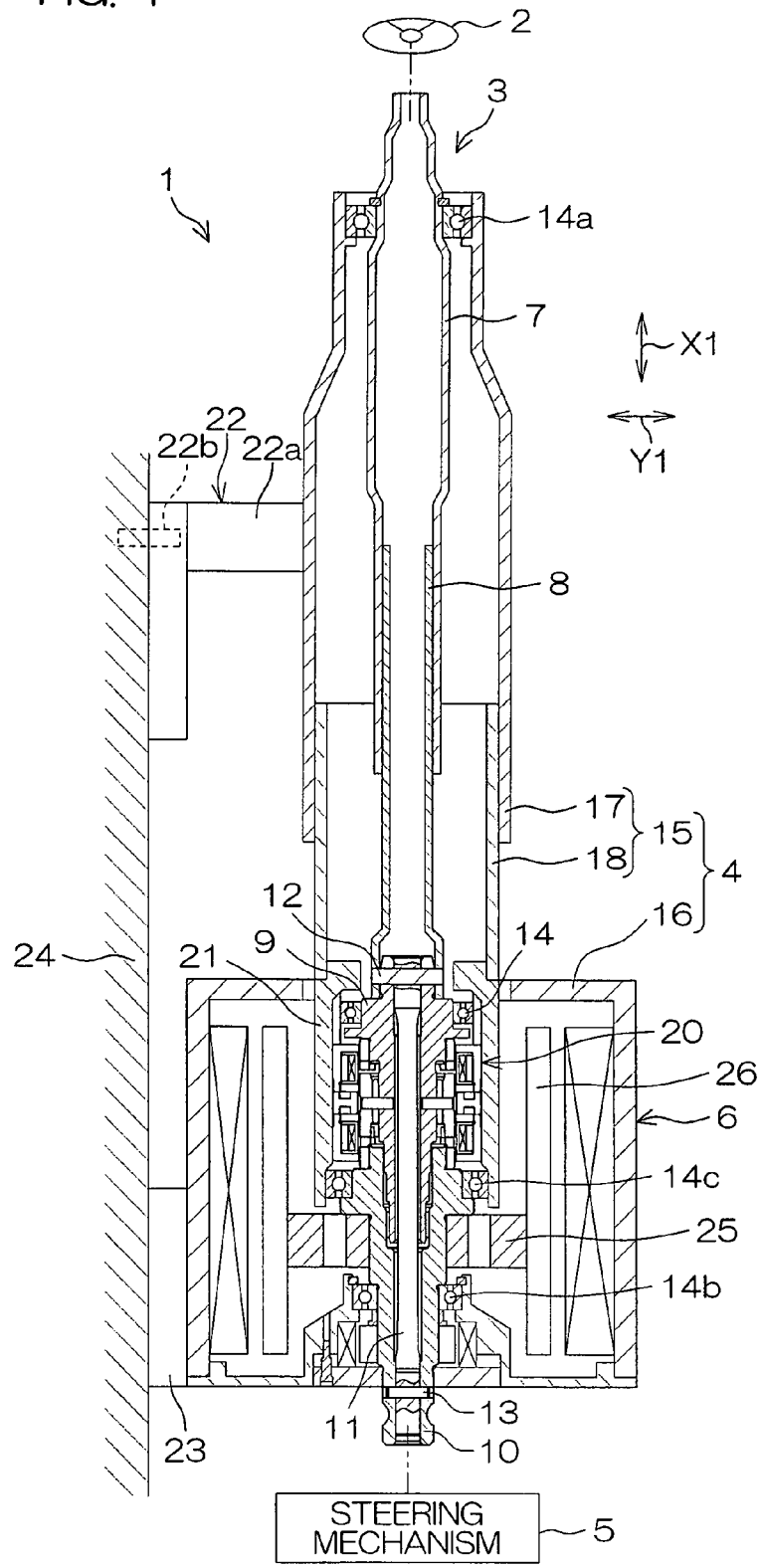
FIG. 1 is a cross-sectional view schematically showing the schematic configuration of an electric power steering apparatus according to an embodiment of the present invention.

Referring now to the drawings, embodiments of the present invention will be specifically described.

FIG. 1 is a cross-sectional view schematically showing the schematic configuration of an electric power steering apparatus 1 as a vehicle steering apparatus according to an embodiment of the present invention.

Referring to FIG. 1, the electric power steering apparatus 1 comprises a steering shaft 3 to which a steering member 2 such as a steering wheel is connected, a steering column 4 for rotatably supporting the steering shaft 3, a steering mechanism 5 such as a rack-and-pinion mechanism connected to the steering shaft 3 through an intermediate shaft (not shown), and an electric motor 6 for steering assist provided coaxially with the steering shaft 3.

The steering shaft 3 includes an upper shaft 7, a lower shaft 8, an input shaft 9, and an output shaft 10 in this order. The upper shaft 7, the lower shaft 8, the input shaft 9, and the output shaft 10 are each in a cylindrical shape, and are arranged coaxially with one another.

A part of the lower shaft 8 is fitted into the inner periphery of the upper shaft 7. The upper shaft 7 and the lower shaft 8 are connected to each other so as to be relatively movable in an axial direction of the steering shaft 3 and integrally rotatable.

A part of the input shaft 9 is fitted into the output shaft 10. The input shaft 9 and the output shaft 10 are connected to each other so as to be relatively rotatable through a torsion bar 11 that is inserted through both the shafts. Specifically, one end of the torsion bar 11 is connected to the input shaft 9 with a pin 12 penetrating the one end and the input shaft 9 in a radial direction Y1 of the steering shaft 3. The other end of the torsion bar 11 is connected to the output shaft 10 with a pin 13 penetrating the other end and the output shaft 10 in a radial direction of the output shaft 10.

A part of the input shaft 9 is fitted into the lower shaft 8. The lower shaft 8 and the input shaft 9 are connected to each other with the pin 12. That is, the lower shaft 8, the input shaft 9, and the torsion bar 11 are connected to one another with the common pin 12.

The steering column 4 rotatably supports the steering shaft 3 through a plurality of bearings 14, 14a, 14b, and 14c. The steering column 4 comprises a tubular jacket 15 rotatably supporting the upper shaft 7 and the lower shaft 8, and a tubular motor housing 16 serving as a part of the electric motor 6.

The jacket 15 includes a tubular upper jacket 17 and a tubular lower jacket 18 that are fitted each other. The upper jacket 17 supports the upper shaft 7 through the bearing 14a so as to be rotatable and integrally movable in the axial direction X1. That is, the steering member 2, the upper shaft 7, and the upper jacket 17 are integrally movable in the axial direction X1.

Figure 2A:
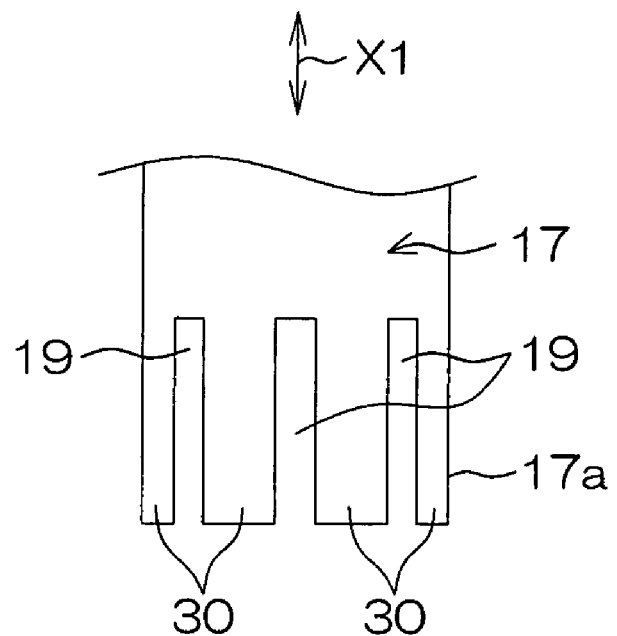
FIGS. 2A and 2B are a side view and a bottom view, respectively, of a lower end of an upper jacket provided in the electric power steering apparatus.
Figure 2B:
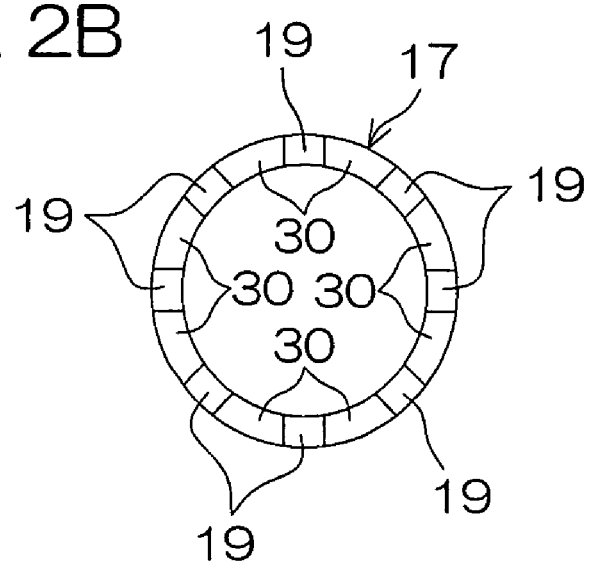

As shown in FIGS. 2A and 2B, a plurality of slits 19 extending in the axial direction X1 are spaced apart a predetermined distance in a circumferential direction of the upper jacket 17 at a lower end 17a of the upper jacket 17. Thus, a plurality of projections 30 extending in the axial direction X1 of the upper jacket 17 are spaced apart in the circumferential direction of the upper jacket 17 at the lower end 17a of the upper jacket 17.

Referring to FIG. 1 again, a part of the lower jacket 18 is fitted into the inner periphery of the upper jacket 17. The upper jacket 17 can move in the axial direction X1 relative to the lower jacket 18 to absorb shock in the collision of a vehicle, for example.

Specifically, a plurality of caulking projections (not shown) are formed on the inner periphery of the upper jacket 17. The caulking projections are caulked to the outer periphery of the lower jacket 18. This allows shock applied to the steering member 2 from a driver who has collided against the steering member 2 (secondary collision) after the collision of the vehicle (primary collision) to be absorbed by both the jackets 17 and 18 relatively moving in the axial direction X1.

The input shaft 9 and the output shaft 10 are inserted through the motor housing 16. The motor housing 16 is connected to the lower jacket 18 through a tubular sensor housing 21 accommodating a torque sensor 20 arranged around the input shaft 9 and the output shaft 10.

The upper jacket 17 and the motor housing 16 are each attached to a part 24 of the vehicle body through a mounting member 22 and a mounting member 23. The mounting member 22 for mounting the upper jacket 17 on the vehicle body part 24 has a mounting bracket 22a fixed to the upper jacket 17 and a connecting pin 22b made of synthetic resin, for example fracturable for connecting the mounting bracket 22a to the vehicle body part 24.

When shock exceeding a predetermined value is applied to the connecting pin 22b in the above-mentioned secondary collision, for example, the connecting pin 22b fractures to release the fixing between the mounting bracket 22a and the vehicle body part 24. As a result, the steering member 2, the upper shaft 7, and the upper jacket 17 are movable in the axial direction X1.

FIG. 3 is an enlarged sectional view of a principal part of the electric power steering apparatus 1, showing the electric motor 6 and its vicinity. Referring to FIG. 3, the electric motor 6 used in the present embodiment is a so-called direct drive brushless motor, which can directly transmit an output of the electric motor 6 to the steering shaft 3.

The electric motor 6 comprises the above-mentioned motor housing 16, a hollow cylindrical rotor 26 supported so as to be rotatable together with the output shaft 10 through an annular support 25 (see FIG. 4), for example, a hollow cylindrical stator 27 opposed to the rotor 26 a predetermined distance apart therefrom in a radial direction of the rotor 26, and a resolver 28 for detecting the rotational position of the rotor 26. A plurality of magnetic poles each composed of a permanent magnet are formed on the outer periphery of the rotor 26, and the stator 27 is obtained by winding a coil around an annular stator core, which is not illustrated.

The motor housing 16 has a tubular main body 50 that opens one end, and a cover member 51 that closes one end of the main body 50 and fitted into and fixed to the one end.

The main body 50 includes a cylindrical tube 52 and an annular endwall 53 extending inward in a radial direction of the tube 52 from one end of the tube 52. The support 25, the rotor 26, the stator 27, the resolver 28, the torque sensor 20, and a part of the sensor housing 21 are arranged inside the tube 52.

Figure 5:
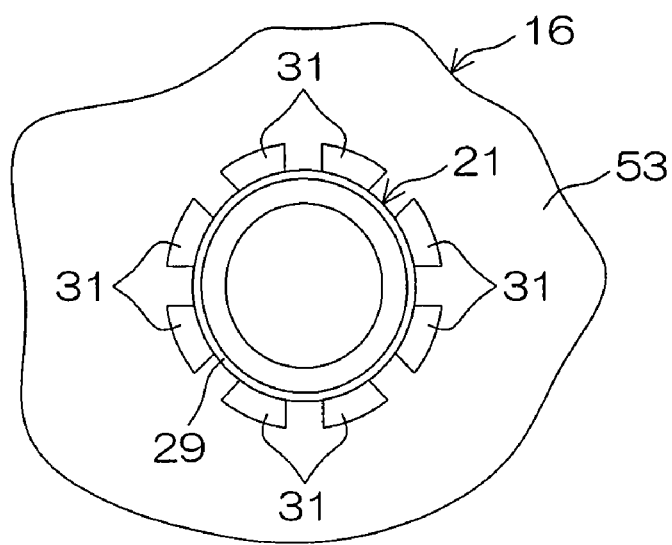
FIG. 5 is a schematic view of a fitted portion of a motor housing and a sensor housing as axially viewed.

Referring to FIGS. 3 and 5, a plurality of notches 31 are formed apart a predetermined distance in a circumferential direction of the endwall 53 on the inner periphery of the endwall 53. The sensor housing 21 is fitted into the inner periphery of the endwall 53. The endwall 53 and the sensor housing 21 are fixed to each other with an interference fit, for example.

The comb-shaped projections 30 at the lower end 17a of the upper jacket 17 shown in FIGS. 2A and 2B can enter the plurality of notches 31 formed on the endwall 53. Referring to FIG. 3, an end 43 of the lower jacket 18 is fitted on and fixed to the outer periphery at an end 32 of the sensor housing 21 projecting toward the steering member 2 from the endwall 53.

An annular step 29 is provided on the outer periphery at the end 32 of the sensor housing 21. An end surface at the end 43 of the lower jacket 18 is abutted against the annular step 29. This reliably regulates the downward movement in the axial direction X1 of the lower jacket 18 relative to the sensor housing 21.

A tube 54 extending concentrically with the tube 52 in the main body 50 is formed at the center on an inner surface of the cover member 51. The output shaft 10 is inserted through the tube 54. The tube 54 is provided with a bearing holder 55 that holds a bearing 14b for rotatably supporting the output shaft 10 and a resolver stator holder 56 that holds a part of the resolver 28 (a resolver stator 36, described later). The output shaft 10 is rotatably supported by the bearing 14b held by the bearing holder 55 and a bearing 14c held on the inner periphery of the sensor housing 21.

The rotor 26 surrounds the input shaft 9 and the output shaft 10 a predetermined distance apart therefrom. An annular space Si is provided between the rotor 26 and the input and output shafts 9 and 10. The support 25, the torque sensor 20, at least a part of the sensor housing 21, and at least a part of the resolver 28 are arranged in the annular space S1.

Specifically, the annular space S1 is partitioned into an upper space S11 and a lower space S12 in the axial direction X1 by the support 25. The torque sensor 20 and at least a part of the sensor housing 21 are arranged in the upper space S11. At least a part of the resolver 28 is arranged in the lower space S12.

The upper space S11 is defined between the rotor 26 and the sensor housing 21. In the collision of the vehicle, the projections 30 at the lower end 17a of the upper jacket 17 that has entered the motor housing 16 through the plurality of notches 31 enter the upper space S11.

Furthermore, a part of the tube 54 formed in the cover member 51 is arranged in the lower space S12.

Figure 4:
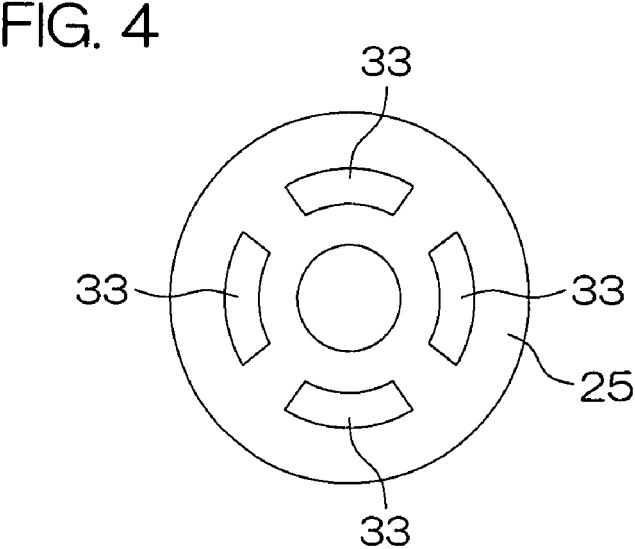
FIG. 4 is a schematic plan view of a support for supporting a rotor in the electric motor.

Referring to FIGS. 3 and 4, the support 25 has a predetermined thickness in its axial direction. One or a plurality of lightening sections 33 passing through the support 25 in the axial direction are provided between the inner periphery and the outer periphery of the support 25. The output shaft 10 is fitted into the inner periphery of the support 25. The support 25 and are fixed so as to be rotatable together with each other by fastening and fitting, for example. The support 25 is fitted into the inner periphery of the rotor 26. The support 25 and the rotor 26 are fixed so as to be rotatable together with each other by tight fit, for example.

This allows the rotor 26 and the output shaft 10 to rotate together with each other. A rotation driving force serving as a steering assist force is applied to the rotor 26 from the stator 27, which can assist the driver in steering.

Referring to FIG. 3 again, the resolver 28 includes a resolver rotor 35 connected to the output shaft 10 so as to be rotatable together with each other, and a resolver stator 36 opposed to the resolver rotor 35 a predetermined distance apart therefrom in a radial direction of the resolver rotor 35.

The resolver stator 36 is held in the resolver stator holder 56 provided in the tube 54, as described above. The resolver rotor 35 is connected to the output shaft 10 at a position opposed to the resolver stator 36 in a radial direction of the resolver stator 36. At least a part of the resolver rotor 35 and at least a part of the resolver stator 36 are arranged in the lower space S12 in the annular space S1 provided radially inside the rotor 26.

When the electric motor 6 is assembled, a sub-assembly SA in which the resolver stator 36 and the bearing 14b are incorporated into the cover member 51 is assembled. The cover member 51 in the sub-assembly SA is fixed to the main body 50 while the bearing 14b are fitted on the output shaft 10. After the resolver rotor 35 is fitted into the output shaft 10, a cover 57 for closing one end of the tube 54 is then fixed to the tube 54 with a bolt 40, for example.

Figure 6A:
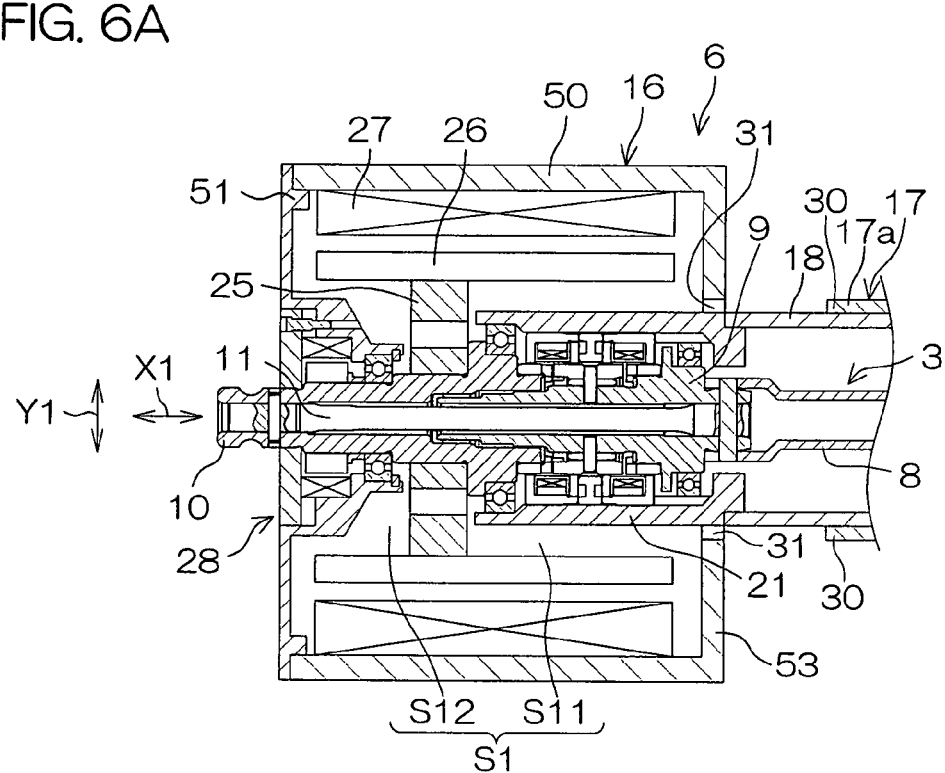
FIGS. 6A and 6B are cross-sectional views of a principal part of the electric power steering apparatus, for explaining the shock absorbing stroke of a steering member.
Figure 6B:
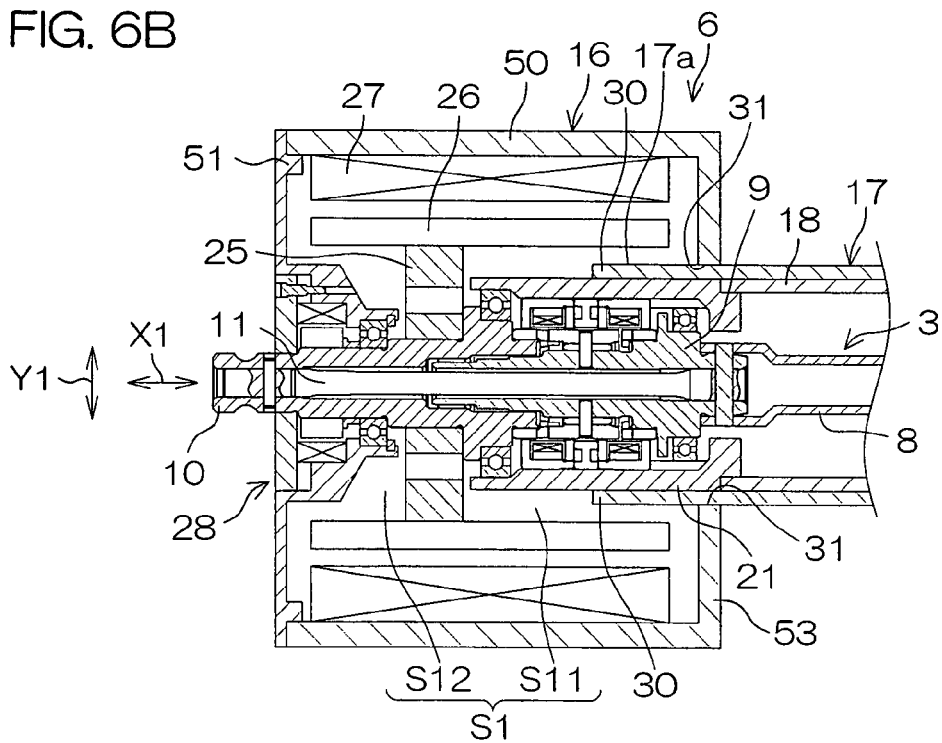

FIGS. 6A and 6B are diagrams for explaining the shock absorption stroke of the steering member 2, where FIG. 6A illustrates a state where the steering member 2 has not been moved, and FIG. 6B illustrates a state where the steering member 2 has been moved.

Referring to FIG. 6A, the steering member 2 is held at a substantially constant position in its axial direction at the normal time when the collision of the vehicle does not occur.

When the collision of the vehicle (primary collision) causes the collision of the driver against the steering member 2 (secondary collision) from this state, shock is applied to the steering member 2 from the driver. The shock applied to the steering member 2 is transmitted to the mounting member 22 through the steering shaft 3, the upper jacket 17, or the like.

When the shock transmitted to the mounting member 22 exceeds a predetermined value, the connecting pin 22b fractures, as described above, which allows the steering member 2, the upper shaft 7, and the upper jacket 17 to move in the axial direction X1. This causes the steering member 2, the upper shaft 7, and the upper jacket 17 to move in the axial direction X1 relative to the lower jacket 18 or the like.

The steering member 2, the upper shaft 7, and the upper jacket 17 are movable until a state where the plurality of projections 30 at the lower end 17a of the upper jacket 17 enter the motor housing 16 through the corresponding notches 31 formed on the endwall 53 to enter the upper space S11 in the annular space S1 defined between the rotor 26 and the sensor housing 21, as shown in FIG. 6B. That is, the shock absorption stroke of the steering member 2 is sufficiently ensured.

As described in the foregoing, in the present embodiment, in the collision of the vehicle, the end of the upper jacket 17 can enter inside of the motor housing 16 (the upper space S11 in the annular space S1). Therefore, the shock absorption stroke of the steering member 2 can be sufficiently ensured.

The shock absorption stroke can be further sufficiently ensured by arranging the torque sensor 20, a part of the sensor housing 21, and a part of the resolver 28 radially inside the rotor 26. Further, the resolver 28 is arranged on the opposite side of the upper jacket 17. In the collision of the vehicle, therefore, the upper jacket 17 can easily enter the motor housing 16.

Figure 7:
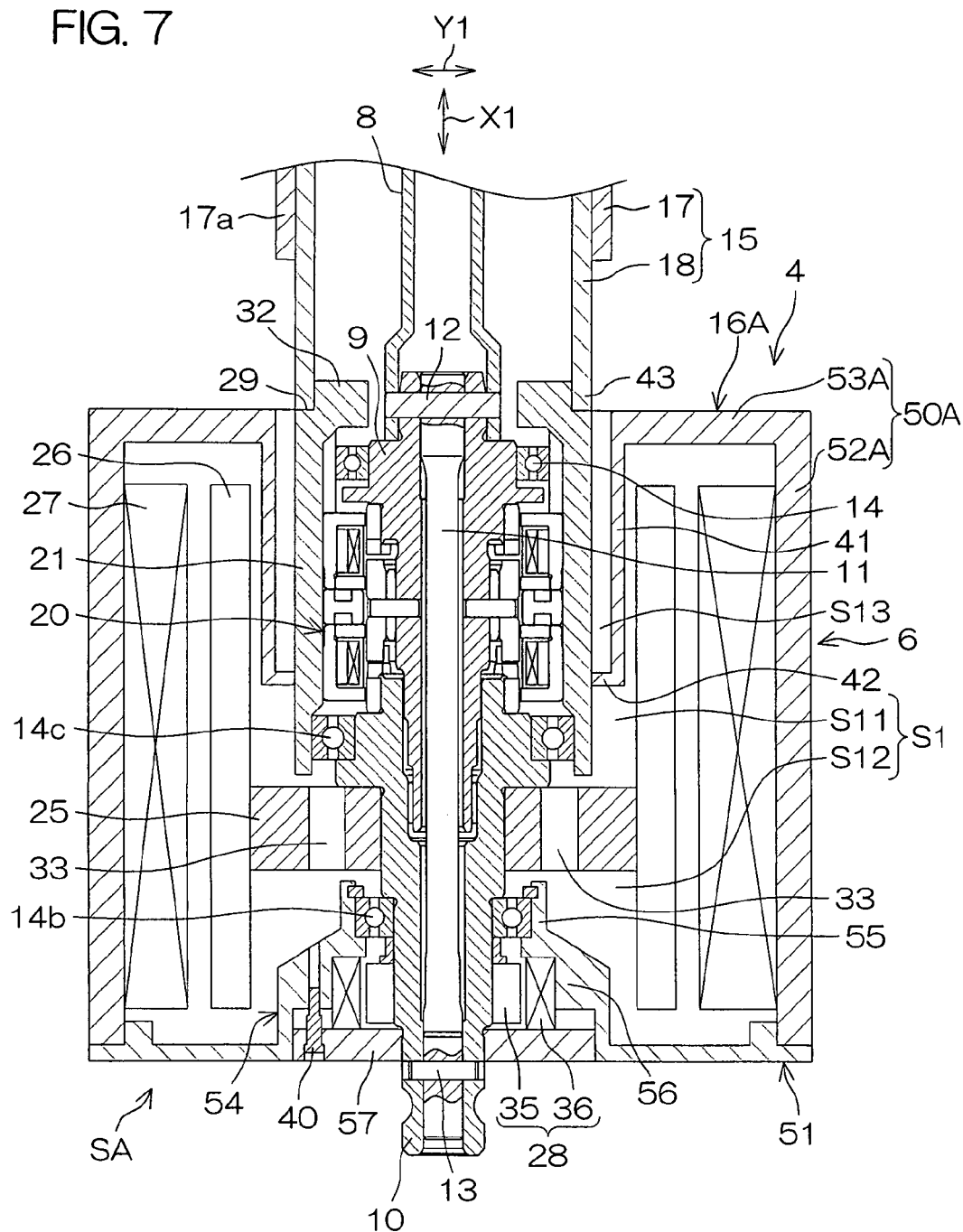
FIG. 7 is an enlarged sectional view showing a part of an electric power steering apparatus according to another embodiment of the present invention.

FIG. 7 is an enlarged sectional view showing a part of an electric power steering apparatus 1 according to another embodiment of the present invention. In FIG. 7, the same components as the sections shown in FIG. 3 described above are assigned the same reference numerals as those shown in FIG. 3 and hence, the description thereof is omitted.

Referring to FIG. 7, the present embodiment mainly differs from the embodiment shown in FIG. 3 in the following. That is, a main body 50A in a motor housing 16A includes an outer tube 52A and an inner tube 41 that are provided concentrically with each other, and an endwall 53A for connecting ends of the outer tube 52A and the inner tube 41. The inner tube 52A extends downward in an axial direction X1 from the endwall 53A.

The outer tube 52A surrounds a stator 27 to fix the stator 27. A bottom wall 42 provided at the bottom of the inner tube 41 is fixed to the outer periphery of a sensor housing 21 by tight fit, for example.

At least a part of the inner tube 41 is arranged between the sensor housing 21 and the rotor 26. Further, an annular space S13 is defined between the sensor housing 21 and the inner tube 41.

That is, the annular space S13 serving as a part of an upper space S11 in an annular space S1 provided radially inside the rotor 26 and surrounding the steering shaft 3 is formed between the tube 41 and the sensor housing 21.

In the collision of the vehicle, a lower end 17a of an upper jacket 17 is adapted to enter the annular space S13 defined between the sensor housing 21 and the inner tube 41.

According to the present embodiment, a notch 31 and a slit 19 need not be formed in the endwall 53A and the upper jacket 17, respectively, so that the endwall 53A and the upper jacket 17 are easily processed. Further, entry of the upper jacket 17 to the annular space S13 between the inner tube 41 and the sensor housing 21, sufficiently ensures the shock absorption stroke of a steering member 2.

Although description was made of the electric power steering apparatus as one example in the present embodiment, the present invention is also applicable to another vehicle steering apparatus. An example is a vehicle steering apparatus capable of changing the ratio of the steering angle of a vehicle to the steering angle of a steering member.

Although the present invention has been described and illustrated in detail, those skilled in the art can easily understand the alternatives, modifications and equivalents thereof. Therefore, the present invention should be construed as in the scope of the appended claims and the equivalents thereof.

The present application corresponds to Japanese Patent application No. 2006-163194 filed with the Japanese Patent Office on Jun. 13, 2006, the disclosure of which is hereinto incorporated by reference.

What is claimed is:

1. A vehicle steering apparatus for a vehicle, comprising:
a steering shaft connected to a steering member;
a jacket for rotatably supporting the steering shaft; and
an electric motor including an annular rotor arranged coaxially with the steering shaft,
the jacket including a tubular upper jacket and a tubular lower jacket that are fitted to each other and are movable axially relative to each other when the vehicle is involved in a collision which causes a driver to impact the steering member,
the rotor being supported so as to be rotatable together with the steering shaft through a support,
an annular space surrounding the steering shaft, the annular space being provided radially inside the rotor, and
a part of the upper jacket entering the annular space when the vehicle is in involved in the collision.

2. The vehicle steering apparatus according to claim 1, wherein the electric motor includes a rotor rotational position detector for detecting the rotational position of the rotor, and at least a part of the rotor rotational position detector is arranged in the annular space.

3. The vehicle steering apparatus according to claim 2, wherein the rotor rotational position detector includes a resolver.

4. The vehicle steering apparatus according to claim 1, wherein the annular space includes an upper space and a lower space partitioned into each other by the support, and the part of the upper jacket enters the upper space when the vehicle is involved in the collision.

5. The vehicle steering apparatus according to claim 4, wherein the electric motor includes a rotor rotational position detector for detecting the rotational position of the rotor, and at least a part of the rotor rotational position detector is arranged in the lower space.

6. The vehicle steering apparatus according to claim 1, further comprising a torque sensor for detecting a steering torque applied to the steering member, wherein at least a part of the torque sensor is arranged in the annual space.

7. The vehicle steering apparatus according to claim 6, further comprising a tubular sensor housing accommodating the torque sensor, wherein respective ends of the sensor housing and the lower jacket are coaxially fitted into each other, at least a part of the sensor housing is arranged radially inside the rotor in the electric motor, and a part of the annular space is defined between the sensor housing and the rotor.

8. The vehicle steering apparatus according to claim 7, wherein the electric motor includes an annular stator surrounding the annular rotor and a motor housing accommodating the rotor and the stator, the motor housing includes a tube surrounding the stator and an endwall provided at one end of the tube and fitted into the outer periphery of the sensor housing, a lower end of the upper jacket includes a plurality of projections extending in an axial direction of the upper jacket and spaced apart in a circumferential direction of the upper jacket, and a plurality of notches through which the plurality of projections are respectively inserted in the collision of the vehicle are formed on the endwall in the motor housing.

9. The vehicle steering apparatus according to claim 7, wherein the electric motor includes an annular stator surrounding the annular rotor and a tubular motor housing accommodating the rotor and the stator, the motor housing includes an outer tube and an inner tube that are provided concentrically with each other, and an endwall for connecting respective ends of the outer tube and the inner tube, the outer tube surrounds the stator to fix the stator, at least a part of the inner tube is arranged between the sensor housing and the rotor, an annular space is defined between the sensor housing and the inner tube, and the part of the upper jacket enters the annular space defined between the sensor housing and the inner tube when the vehicle is in involved in the collision which causes the driver to impact the steering member.

* * * * *